Feb. 9, 1954     A. CHRISTEN     2,668,303
MACHINE FOR CUTTING SCREW THREADS
Filed Dec. 28, 1949     3 Sheets-Sheet 1

INVENTOR
ANDRÉ CHRISTEN
BY Wenderoth, Lind
    + Ponack
ATTORNEYS

Feb. 9, 1954  A. CHRISTEN  2,668,303
MACHINE FOR CUTTING SCREW THREADS
Filed Dec. 28, 1949  3 Sheets-Sheet 2
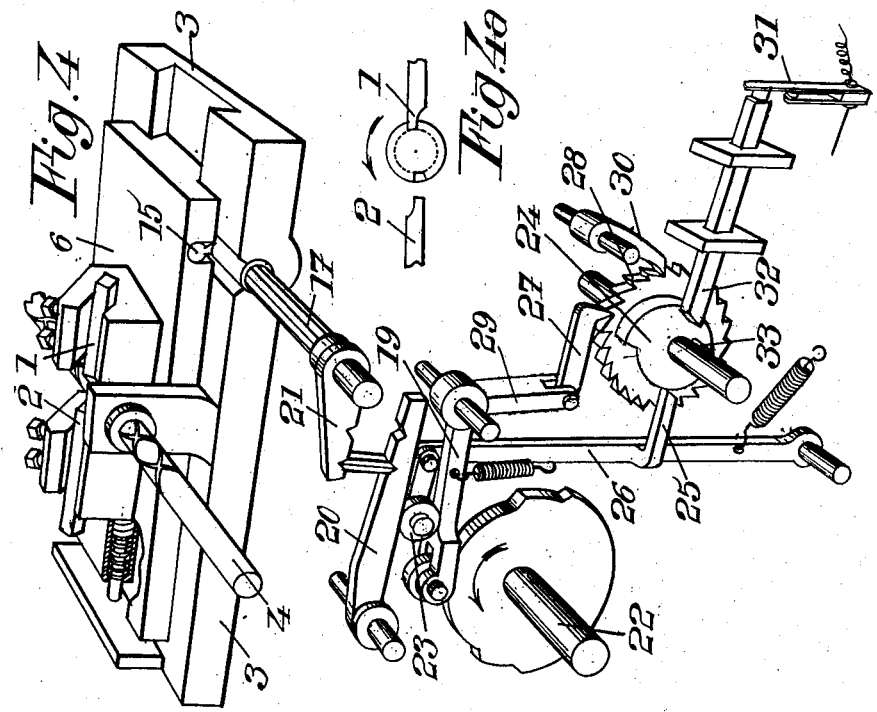
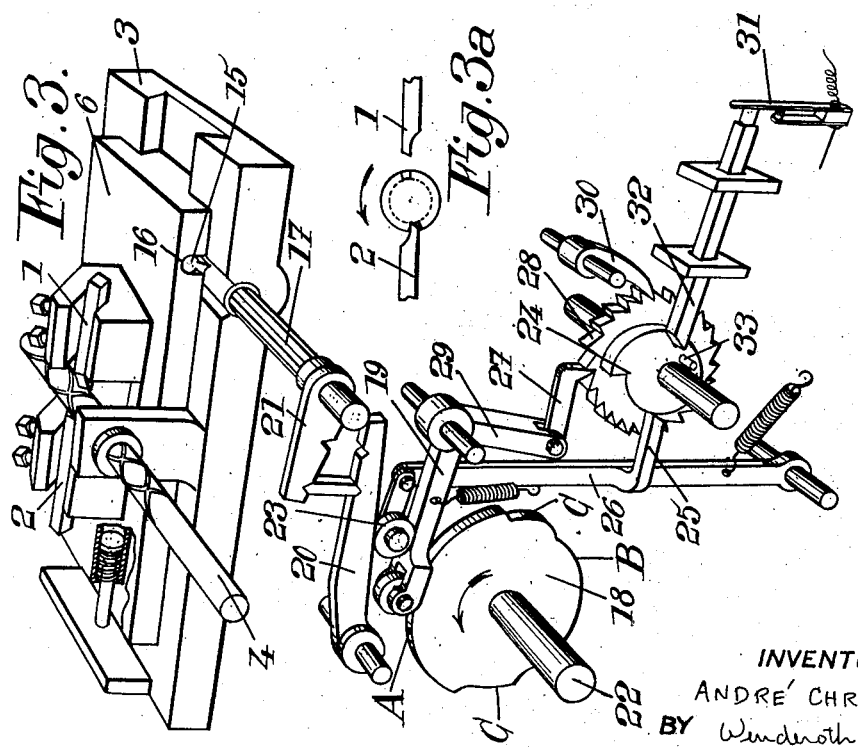
INVENTOR
ANDRÉ CHRISTEN
BY Wenderoth, Lind & Ponack
ATTORNEYS Feb. 9, 1954  A. CHRISTEN  2,668,303
MACHINE FOR CUTTING SCREW THREADS
Filed Dec. 28, 1949  3 Sheets-Sheet 3

INVENTOR
ANDRÉ CHRISTEN
BY Wenderoth, Lind
& Ponack
ATTORNEYS

Patented Feb. 9, 1954

2,668,303

UNITED STATES PATENT OFFICE 2,668,303

MACHINE FOR CUTTING SCREW THREADS

André Christen, Limeil-Brevannes, France

Application December 28, 1949, Serial No. 135,374

Claims priority, application France March 8, 1949

5 Claims. (Cl. 10—101)

The present invention relates to machine for cutting the threads of screws having at least two crossed threads, a right hand one and a left hand one, as it is the case with the screws or threaded shafts of automatic screw drivers, drilling devices, etc. (including a driving member having a reciprocating movement on the screw, which causes it to rotate always in the same direction, one of the threads being used during the stroke in one direction and the other during the return stroke).

Its chief object is to provide a machine of this kind which is simpler than those used up to the present time.

Preferred embodiments of the present invention will be hereinafter described with reference to the accompanying drawings, given merely by way of example and in which:

Figs. 3 to 5 are perspective views showing some of the elements of said machine.

Figure 5:
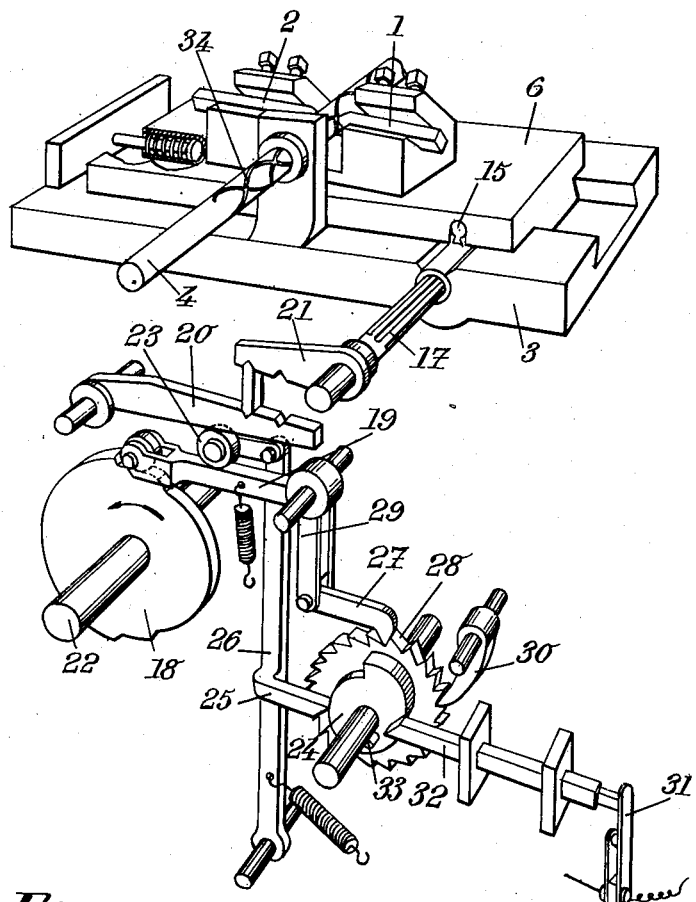
Figure 5A:
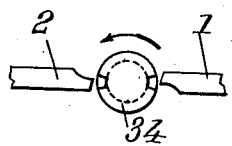

Figs. 3a, 4a, 5a diagrammatically illustrate the positions of the cutting tools on Figs. 3, 4 and 5.

The machine includes a carriage system holding at least two tools intended to work alternately on the shaft to be threaded, this system being driven with a reciprocating motion along said shaft, itself rotated in a continuous fashion.

It is found that, in these conditions, one of the tools will cut a right hand (or left hand, according to the direction of rotation) thread during the stroke of the tool holder in one direction, and the other tool a left hand (or right hand) thread during the return stroke.

If, furthermore, I manage so that, at the beginning of a new cycle, the bar is not located exactly in the same position as at the beginning of the preceding one but, for instance, has rotated through one half of a revolution or a smaller fraction of a revolution, each of the tools can cut two or more right hand threads and two or more left hand threads.

Such an operation can be obtained, for instance, as illustrated by the drawings.

Figure 1:
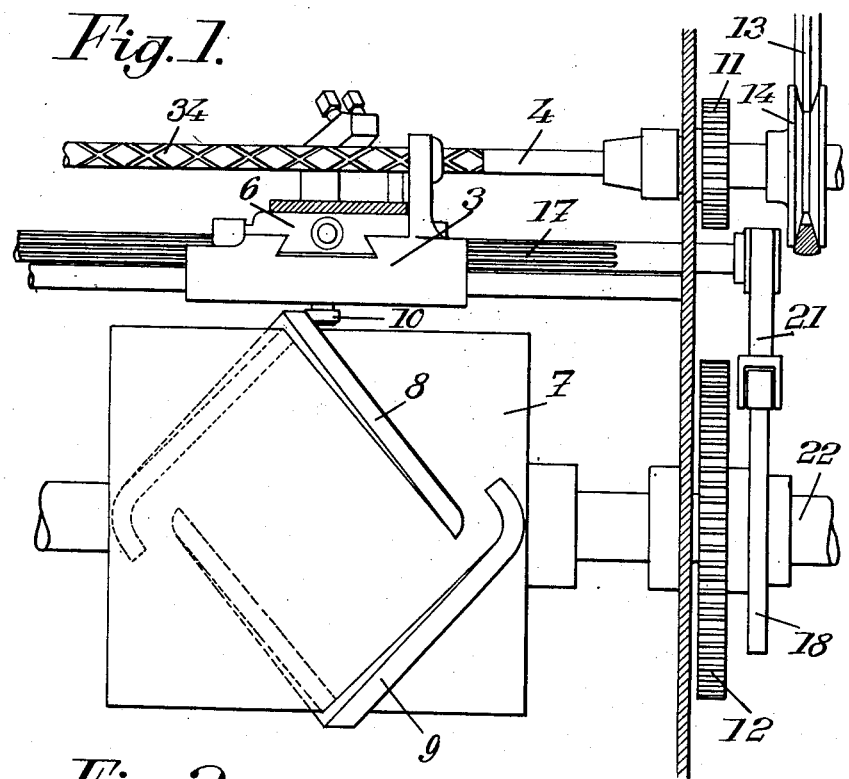
Figs. 1 and 2 show, respectively in elevation and in plan view, the essential elements of a cutting machine for making right and left hand threads, according to my invention.
Figure 2:
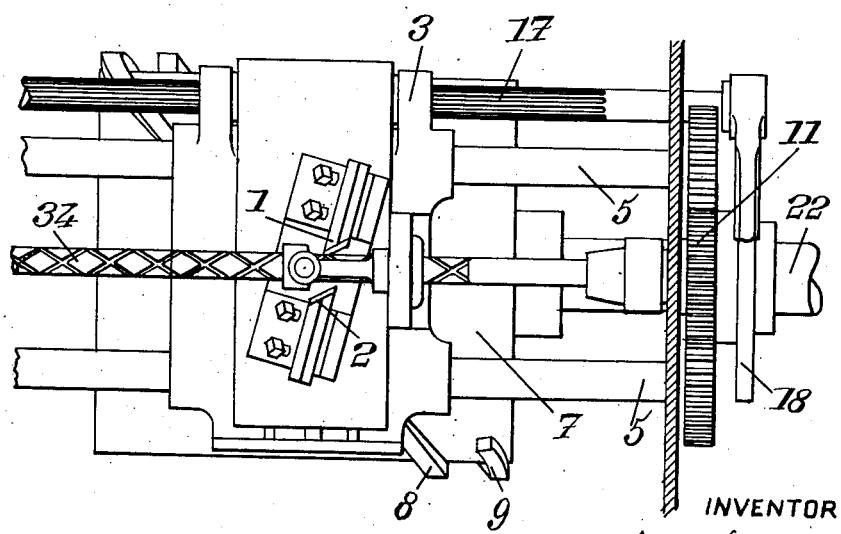

Figs. 1 and 2 show tools 1 and 2 located opposite each other are carried by a double carriage including: on the one hand, a primary carriage 3 having a reciprocating motion along the shaft 4 to be machined, said carriage being, for this purpose, mounted slidable on rods 5; and on the other hand, a secondary carriage 6 movable transversely to the first one and carrying tools 1 and 2, by means of tool holders of conventional type.

The tools are, of course, suitably inclined at an angle which is preferably adjustable, and they are sufficiently distant from each other to permit of shifting the contact with bar 4 from one tool to the other by a suitable transverse displacement of carriage 6.

To obtain the desired respective displacements of carriages 3 and 6, I make use for instance of the following means.

The reciprocating motion of carriage 3 is controlled by a drum 7 provided with helical ridges 8, 9 on which runs a roller 10 carried by carriage 3, this drum being driven with a speed suitably chosen with respect to that of shaft 4, through means, including gears 11, 12, for interconnecting said shaft and said drum (it is supposed on the drawing that energy is transmitted to shaft 4 through a belt 13 and a pulley 14).

The speed ratio will be determined in particular in such manner as to make it possible for each tool to cut two or several threads of the same direction.

On the other hand, I provide, to control the reciprocating transverse motion of carriage 6, a device which actuates a finger 15 cooperating with a notch 16 provided in said carriage, movement being transmitted to the finger through a grooved shaft 17 (Figs. 3 to 5).

This device includes, for instance, a cam 18 of suitable shape driven together with drum 7, 8, 9 and intended to cooperate with various intermediate levers such as 19, 20, 21, which will be more explicitly referred to hereinafter. Cam 18 includes two portions A and B which correspond respectively to the two working positions (Figs. 3a and 4a) of tools 1, 2 and two smaller intermediate portions C which correspond to a stroke end neutral position (Fig. 5a).

The speed of revolution of shaft 22 which carries cam 18 is such that the two portions C correspond to the two ends of the stroke of carriage 3.

In order to permit of obtaining a gradual increase of the depth of cut of said tools, I make use of a roller or other intermediate member 23 interposed between two levers such as 19, 20, this roller being movable in such manner that the ratio between the movements transmitted by cam 18 and the movements received by finger 15 varies for every reciprocation of the holder.

Of course, the automatic depth of cut increase should be the same for both tools, which will be obtained if, in the neutral position of carriage 6, as shown by Fig. 5, the surfaces of levers 19 and 20 that cooperate with roller 23 are parallel.

In order to displace roller 23, I have recourse to any known system used in machine tools, for instance to a cam 24 capable of cooperating with the finger 25 of a lever 26 acting on roller 23.

Cam 24 is for instance driven by a pawl 27 cooperating with a ratchet wheel 28, rigid with said cam 24, pawl 27 being operated by the displacements of a lever 29 rigid with arm 19. A retaining pawl is visible at 30. Cam 24 is, for instance, in the form of an Archimedean spiral.

The system is advantageously completed by means for automatically stopping the machine when the depth of cut of the threads has reached a given value, at the end of a revolution of cam 24, these means including, for instance, if the machine is driven by an electric motor, a switch 31 controlled at 32 by cam 24 by means of an abutment 33 carried by said cam.

Figs. 3 to 5 show the machine in three different positions, Figs. 3 and 4 corresponding to the action of the respective tools and Fig. 5 corresponding to the end of a carriage stroke.

Such a machine permits of establishing, in a very simple manner, threaded rods with crossed threads, as diagrammatically shown on the drawing at 34.

Of course this machine might be used for other purposes, in particular for cutting threads in only one direction, one of the tools remaining inactive.

In a general manner, while I have, in the above description, disclosed what I deem to be practical and efficient embodiments of my invention, it should be well understood that I do not wish to be limited thereto as there might be changes made in the arrangement, disposition and form of the parts without departing from the principle of the present invention as comprehended within the scope of the accompanying claims.

What I claim is:

1. A machine for cutting crossed threads in a cylindrical bar which comprises, in combination, a frame including bearing means for said bar, a carriage movable with respect to said frame in a direction parallel to the axis of said bar, a drum journalled in said frame parallel to said bar, means for driving said bar and said drum each constantly in the same direction, cooperating cam and follower means on said drum and said carriage for imparting a reciprocating movement to said carriage parallel to said bar in response to rotation of said drum always in the same direction, two tools mounted on said carriage movable with respect thereto only transversely to said direction and arranged for cutting threads in said bar in opposite directions, respectively, cam means having opposed working surfaces and operatively connected with said driving means and means actuated by said working surfaces for actuating said tools transversely to said carriage alternately in one direction and the other in response to successive reversals of the movement thereof to bring said tools alternately into working contact with said bar during opposed displacements of said carriage along said bar, respectively.

2. A machine for cutting crossed threads in a cylindrical bar which comprises, in combination, a frame including bearing means for said bar, a carriage movable with respect to said frame in a direction parallel to the axis of said bar, a drum journalled in said frame parallel to said bar, means for driving said bar and said drum each constantly in the same direction, cooperating cam and follower means on said drum and said carriage for imparting a reciprocating movement to said carriage parallel to said bar in response to rotation of said drum always in the same direction, two tools mounted opposite to each other on said carriage movable with respect thereto only transversely to said direction, said tools being inclined in opposite directions with respect to said bar for cutting threads therein during opposed displacements of said carriage, respectively, cam means having opposed working surfaces and operatively connected with said driving means and means actuated by said working surfaces for actuating both of said tools simultaneously transversely to said carriage alternately in one direction and the other in response to successive reversals of the movement thereof, to bring said tools into working contact with said bar during opposed displacements of said carriage along said bar respectively.

3. A machine for cutting threads in a cylindrical bar which comprises, in combination, a frame including bearing means for said bar, a first carriage movable with respect to said frame in a direction parallel to the axis of said bar, a drum journalled in said frame parallel to said bar, means for driving said bar and said drum each constantly in the same direction, cooperating cam and follower means on said drum and said carriage for imparting a reciprocating movement to said carriage parallel to said bar in response to rotation of said drum always in the same direction, a second carriage slidably carried by the first one in a direction transverse to the first mentioned direction, two tools mounted opposite to each other on said second carriage, said tools being inclined in opposite directions with respect to said bar so as to be able to cut threads therein during opposed displacements of said first carriage, respectively, cam means having opposed working surfaces and operatively connected with said driving means and means actuated by said working surfaces for reciprocating said second carriage with respect to the first one in response to successive reversals of the movement of said first carriage to bring said tools alternately into working contact with said bar during opposed displacements of said first carriage along said bar respectively.

4. A machine according to claim 1 further including cam means operative by said bar and drum driving means for increasing the depth of cut of said tools for successive cutting operations thereof.

5. A machine according to claim 3 further including cam means for gradually increasing the amplitude of the transverse reciprocating movement of said second carriage and pawl and ratchet means operative by said second carriage reciprocating means for actuating said cam means on every successive cutting operation of each of said tools.

ANDRÉ CHRISTEN.

References Cited in the file of this patent

UNITED STATES PATENTS

| Number | Name | Date |
| --- | --- | --- |
| 908,146 | Schlesinger | Dec. 29, 1908 |
| 1,866,838 | Brustle | July 12, 1932 |
| 2,468,478 | Ardoin | Apr. 26, 1949 |

FOREIGN PATENTS

| Number | Country | Date |
| --- | --- | --- |
| 108,497 | Great Britain | Aug. 16, 1917 |